US007981275B2

(12) United States Patent
Toledo Antonio et al.

(10) Patent No.: US 7,981,275 B2
(45) Date of Patent: Jul. 19, 2011

(54) CATALYTIC COMPOSITION FOR HYDROPROCESSING OF LIGHT AND INTERMEDIATE OIL FRACTIONS

(75) Inventors: José Antonio Toledo Antonio, Cárdenas (MX); José Escobar Aguilar, Cárdenas (MX); María Antonia Cortés Jacome, Cárdenas (MX); Maria de Lourdes Mosqueira Mondragon, Cárdenas (MX); Víctor Pérez Moreno, Cárdenas (MX); Carlos Angeles Chávez, Cárdenas (MX); Esteban López Salinas, Cárdenas (MX); Marcelo Lozada y Cassou, Cárdenas (MX)

(73) Assignee: Instituto Mexicano del Petroleo, Mexico City (MX)

( * ) Notice: Subject to any disclaimer, the term of this patent is extended or adjusted under 35 U.S.C. 154(b) by 790 days.

(21) Appl. No.: 10/574,944

(22) PCT Filed: Oct. 10, 2003

(86) PCT No.: PCT/MX03/00081
§ 371 (c)(1),
(2), (4) Date: Dec. 2, 2009

(87) PCT Pub. No.: WO2005/035117
PCT Pub. Date: Apr. 21, 2005

(65) Prior Publication Data
US 2010/0038285 A1   Feb. 18, 2010

(51) Int. Cl.
*C10G 45/08* (2006.01)
*C10G 45/04* (2006.01)
*C10G 45/06* (2006.01)

(52) U.S. Cl. .............. 208/216 R; 208/208 R; 208/209; 208/243; 208/244; 208/249; 208/217; 208/295; 502/208; 502/210; 502/211; 502/213; 502/300; 502/305; 502/308; 502/309; 502/311; 502/313; 502/314; 502/315; 502/325; 502/326; 502/349; 502/350; 502/353

(58) Field of Classification Search .................... 208/249
See application file for complete search history.

(56) References Cited

U.S. PATENT DOCUMENTS

| 2,853,257 | A  | 9/1958  | Cook |
| 3,840,473 | A  | 10/1974 | Beuther et al. |
| 3,852,165 | A  | 12/1974 | Robson |
| 4,388,222 | A  | 6/1983  | Wilson et al. |
| 5,089,462 | A  | 2/1992  | Wilson et al. |
| 6,383,975 | B1 | 5/2002  | Rocha et al. |
| 6,534,437 | B2 | 3/2003  | Eijsbouts et al. |
| 6,582,590 | B1 | 6/2003  | Riley et al. |
| 2002/0000396 | A1 | 1/2002 | Eijsbouts |
| 2002/1021460 |    | 9/2002 | Moy et al. |
| 2003/0106839 | A1* | 6/2003 | Coker et al. .............. 208/216 R |
| 2006/0078726 | A1 | 4/2006 | Antonio et al. |

FOREIGN PATENT DOCUMENTS

| EP | 0 448 117 | 9/1994 |
| EP | 0 469 675 | 5/1996 |
| JP | 55-125196 | 9/1980 |

OTHER PUBLICATIONS

Kasuga et al. Formation of Titanium Oxide Nanotube, Langmuir 1998, 14, 3160-3163.*
Inoue et al., Characteristics of Novel Titania Catalyst Prpeared by Multi-Gelation Method in Deep-Desulfurization Condition, Fuel Chemistry Division Preprints 2003, 48(2), 497.
Kroto et al, $C_{60}$: Buckminsterfullerene, Nature, vol. 318, Nov. 14, 1985.
Iijima, Helical Microtubules of Graphitic Carbon, Nature, vol. 354, Nov. 7, 1991.
Margulis et al., Polyhedral and Cylindrical Structures of Tungsten Disulphide, Nature, vol. 360, Dec. 3, 1992.
Rao et al., Inorganic Nanotubes, Dalton Trans., 2003, 1-24.
Lozada-Cassou, The Force Between Two Planar Electrical Double Layers, J. Chem. Phys., 80(7), Apr. 1, 1984.
Lozada-Cassou et al., Three Point Extension for Hypternetted Chain and Other Integral Equation Theories: Numerical Results, J. Chem. Phys., 92(2) Jan. 15, 1990.
Yeomans et al., The Structure of Electrolytes in Cylindrical Pores, J. Chem. Phys., 98(2) Jan. 15, 1993.
Degreve et al., Monte Carlo and HNC/MSA Results for an Asymmetrical Electrolyte in an External Electrical Field of Spherical Geometry, Molecular Physics, 1995, vol. 86, No. 4, 759-768.
Lozada-Cassou et al., Violation of the Electroneutrality Condition in Confined Charged Fluids, Physical Review E, vol. 53, No. 1, Jan. 1996.
Lozada-Cassou et al., Correlation of Charged Fluids Separated by a Wall, Physical Review Letters, vol. 77, No. 19, Nov. 4, 1996.
Lozada-Cassou et al., Correlation of Charged Fluids Separated by a Wall of Finite Thickness: Dependence on the Charge of the Fluid and the Wall, Physical Review E, vol. 56, No. 3, Sep. 1997.

(Continued)

Primary Examiner — Glenn A Caldarola
Assistant Examiner — Michelle L Stein
(74) Attorney, Agent, or Firm — Roylance, Abrams, Berdo & Goodman, L.L.P.

(57) ABSTRACT

The present invention relates to the novel catalytic composition having a high specific activity in reactions involving hydroprocessing of light and intermediate petroleum fractions, and preferably in hydrodesulphurization and hydrodenitrogenation reactions. The inventive catalyst contains at least one element of a non-noble metal from group VIII, at least one element from group VIB and, optionally, a group one element of the VA group, which are deposited on a novel catalytic support comprising of an inorganic metal oxide from group IVB, consisting of an (1D) one-dimensional nanostructured material having nanofibers and/or nanotube morphology with high specific surface area of between 10 and 500 $m^2/g$.

26 Claims, 3 Drawing Sheets

OTHER PUBLICATIONS

Yu et al., Charge Separation in Confined Charged Fluids, Physical Review Letters, vol. 79, No. 19, Nov. 10, 1997.

Armstrong et al., "TiO2-B Nanowires" Agnew. Chem. Int. Ed. 2004, 43, 2286-2288. Published Online: Apr. 16, 2004.

Zhu et al., "Hydrogen Titanate Nanofibers Covered with Anatase Nanocrystals: A Delicate Structure Achieved by the Wet Chemistry Reaction of the Titanate Nanofibers", J. Am. Chem. Soc. 2004, 126, 8380-8381.

* cited by examiner

CATALYTIC COMPOSITION FOR HYDROPROCESSING OF LIGHT AND INTERMEDIATE OIL FRACTIONS

INVENTION TECHNICAL FIELD

The present invention relates to the novel catalytic composition having a high specific activity in reactions involving hydroprocessing of light and intermediate petroleum fractions, and preferably in hydrodesulphurization and hydrodenitrogenation reactions. The inventive catalyst contains at least one element of a non-noble metal from group VIII, at least one element from group VIB and, optionally, a group one element of the VA group, which are deposited on a novel catalytic support comprising of an inorganic metal oxide from group IVB, consisting of an (1D) one-dimensional nanostructured material having nanofibers and/or nanotube morphology with high specific surface area of between 10 and 500 $m^2/g$.

INVENTION BACKGROUND

Environmental government dependences demand fuels with low content of metals such as sulphur, nitrogen, nickel vanadium, among others. Moreover, in order to take advantage of oil reserves, it is necessary to process each time heavier oils, than, the content of such contaminants increase in produced fuels, thus, it is necessary to develop new processes and catalytic materials for the elimination of this contaminant from hydrocarbons or fossil fuels in a most efficient way, to minimize polluting gas exhausts to the atmosphere, to satisfy the ecologic regulations that are turning more strict with the time. The most efficient industrial processes for polluting removal from fossil fuels are the hydroprocessing processes, which are practically applied to all petroleum fractions, such as fuels, diesel, intermediate and heavy distillates, heavy strait run gas oil (Feeding to Fluid Catalytic Cracking, FCC). For the specific case of the present invention light and intermediate petroleum fractions are considered, those comprising hydrocarbons whose boiling points are equal or lower than 180° C. and intermediate petroleum fractions, those comprising hydrocarbons whose boiling points are equal or higher than 180.1° C. and lower or equal to 400° C.

In the hydroprocessing processes the light and intermediate petroleum fractions are hydrotreated and/or hydrodesintegrated in the presence of hydrogen. The hydroprocessing processes comprise all processes in which a hydrocarbons fraction reacts with hydrogen at high temperature and pressure, and include processes such as: hydrogenation, hydrodesulphurization, hydrodenitrogenation, hydrodemetalization, hydrodearomatizacion, hydroisomerization, hydrodesintegration.

The catalysts used in hydroprocessing processes are mainly constituted of at least one metal from group VIII and at least one non noble metal component from group VIB from the periodical table, deposited in a specific high area support constituted by metal oxides, such as alumina, silica, titania and/or mixtures, containing optionally a secondary promoters or additives such as halogen, phosphorous, boro, etc. Catalysts are generally prepared by impregnating supports with aqueous solutions containing metals compounds, followed by drying and calcination procedures. Preparation procedures for hydroprocessing catalysts have been stated in U.S. Pat. Nos. 5,089,462 and 2,853,257 as well as in European patents EP 0,448,117 and 0,469,675.

Commonly used supports are based on a refractory material constituted of alumina. The molybdenum-alumina catalysts promoted with cobalt are generally used when limiting specifications are only hydrodesulphurization, while molybdenum-alumina catalysts promoted with nickel are widely used when hydrodenitrogenation and partial saturation of aromatic (hydrodearomatization) content is required besides hydrodesulfurization, due to the high hydrogenating activity inherent to nickel.

On the other hand, it has been determined that incorporating metal components from IVB group from the periodical table, such as titanium, in hydrotreating catalysts as promoters, increase the catalytic activity (U.S. Pat. Nos. 5,089,462, 4,388,222). Also incorporation of other components like phosphorous, boron, etc., to the hydroprocessing catalysts promotes the catalytic activity by an increase in the support acidity (U.S. Pat. No. 3,840,473). However, the phosphorous content cannot be higher than 0.5 wt. % in catalyst containing titanium as promoter, because it contributes to the decreasing of the catalytic activity.

The desulphurization activity of molybdenum increases from two to four times, when the refractory material used as supports consists of titanium oxide. However, nanocrystalline titanium oxide presents low surface area, around 50 $m^2/g$, being the reason of a non yet successful commercial application (Japanese patent JP 55125196). To increase the specific activity in titanium oxide based catalysts, the manufacturers have resorted to mixtures of titanium oxide with other oxides such as: titanium-alumina, titanium-zirconium, titanium-hafnium, etc., as supports for hydrotreating catalysts, obtaining specific area between 150 to 200 $m^2/g$, depending on the method used for its synthesis. However, increases achieves in the hydrodesulphurization activity in such catalysts have been very small compared to the alumina based catalysts; which has not been substituted due to its low cost.

Recently, Inoue et al. (Prepr. Pap.-Am. Chem. Soc. Div. Fuel Chem, 2003, 48 (2), 497) have reported the synthesis of titanium oxide based supports with high specific area through a pH swing method, which consists of precipitating and dissolving the smallest polymeric particles of titanium oxyhydroxide formed during precipitation. The addition of an acid solution, dissolve the smallest particles, which are precipitated with the addition of a base solution. With this synthesis method, homogeneous nanoparticles of titanium oxide with anatase structure are obtained. The crystallite sizes are between 7 and 10 nm, they are thermally stable at temperatures as high as 500° C. and they present surface areas between 150 to 200 $m^2/g$. By incorporating molybdenum and cobalt as active phases to this $TiO_2$ support, the activity to hydrodesulphurization and hydrodenitrogenation reactions increase two or three times more compared with alumina based catalysts. The authors report low hydrogen consumption with molybdenum cobalt on $TiO_2$ catalysts compared with alumina based catalyst, which increase potential application.

The most relevant advances recently achieved concerning hydroprocessing catalysts for hydrodesulfurization and hydrodesnitrogenation reactions are those based on nickel molybdenum-tungsten non supported phases (U.S. Pat. No. 6,534,437, 6,582,590). These Ni—Mo—W—S bulk catalysts present high specific areas between 150 to 200 $m^2/g$. Hydrodesulphurization activity of such catalysts was measured with a Dibenzothiophene molecule. They present a specific activity measured in [molecules/g*s], similar to the conventional catalysts supported on alumina. However, these kind of catalysts present high density, then, in a volume unit high amount of catalysts is loaded than with a conventional catalyst, then the volume relative activity is around four times higher compared to the conventional nickel-molybdenum supported on alumina catalysts commercially available. These catalysts are only constituted of active phases and the cost associated to its production is high.

The discovery of the $C_{60}$ carbon fullerene structure in the 80s, which consists of a hollow sphere with walls made up of sixty carbon atoms (H. W. Kroto, et al. Nature, 318, 162-163, 1985), gave rise to a new kind of materials, called carbon nanotubes (Iijima, S. Nature, 354, 56-58, 1991). By increasing the amount of carbon atoms in the fullerene structure give rise these ellipsoidal forms, named nanotubes. These nanotubes present semiconducting properties interesting for the construction of nanoelectronic devices. On the other hand, manufacturing of nanotubes has been extended to inorganic materials, and in 1992, the first inorganic nanotube with fullerene structure were obtained constituted of $MoS_2$ and $WS_2$ (R. Tenne et al. Nature, 360,444-446, 1992). Nanotubular morphology has extended toward other materials constituted by inorganic oxides, such as $VO_2$, $ZrO_2$, $TiO_2$, $Sio_2$, $Al_2$, $Al_2O_3$, $ZnO$, $TeO_2$, etc., and others kind of inorganic materials like sulphurs, selenides, telures, nitrides and carbides of transition metals (C. N. R. Rao and M. Nath, Dalton Trans. 1-24, 2003).

A series of studies on confined fluids, M. Lozada y Cassou et al. (J. Chem. Phys. 80, 3344-3349 (1984); J. Chem. Phys. 92, 1194-1210 (1990); J. Chem. Phys. 98, 1436-1450, (1993); Mol. Phys. 86. 759-764 (1995); Phys. Rev. E. 53, 522-539 (1996), Phys. Rev. Letts. 77, 4019-4022, (1996); Phys. Rev. E. 56, 2958-2965, (1997), phys. Rev. Letts. 79, 3656-3659 (1997)), showed that a nano-scale confinement and curvature, produce electric fields and molecular strengths of outstanding intensity. These studies show, for example, that in nano-confinement a charge separation in a ionic fluid can be produced (Phys. Rev. Letts. 79, 3656-3659 (1997)) implying confinement pressures in the order of 25 atmospheres and intermolecular repulsion strengths of $3.7 \times 10^9$ Newtons. These results led towards the search or tubular structures, at nanometric scale, for new materials with catalytic or semiconducting properties.

The nanotubes are strategic materials for applications where adsorption phenomena is involved, as they increase the contact area while exposing the inner and outer surfaces, the vertices and the surface of the interlaminar regions of the nanotubes walls. Besides the increase of the strength fields intensity due to nanotube confinement and curvature, must to improve catalytic activity in materials using nanotubes as supports of active phases. Therefore, we decided to look for new routes for the synthesis of inorganic oxide nanotubes, which would increase the specific surface area displayed by materials and provide a large contact area and confinement surface to perform catalytic processes.

The appliers have recently presented a PCT MX 03/00068 patent application, dated Aug. 22, 2003, regarding a procedure for the synthesis and thermal stability of nanotubes and or hydrogen titanate and titanium oxide nanofiber with orthorhombic structure. These one-dimensional nanostructures present high specific surface areas between 100 and 500 $m^2/g$, and they are thermally stable at temperatures above 400° C., that is why they can be used as active phases supports of the metal component from group VIII and non noble metal components from group VIB for the formulation of hydroprocessing catalysts, being one of the reason of the present invention.

INVENTION SPECIFICATION

The present invention is related to a novel catalytic composition highly active for hydroprocessing reactions of light and intermediate oil fractions, preferably for hydrodesulphurization and hydrodenitrogenation, consisting of a element of the group VIII, starting from an aqueous solution from a molybdenum or tungsten salt, or combinations of them and of a least one element from group VIB, starting from an aqueous solution of cobalt and/or nickel or combinations among them and of impregnation of a third component consisting of an phosphoric, boric or halogenous acid aqueous solution, preferably phosphoric acid, on top of an inorganic oxide support from a metal belonging to IVB group which characterizes for having fibrilar and/or nanotubular morphology forming one-dimensional nanostructured materials (1D) which display specific surface areas between 10 to 500 $m^2/g$.

Thus, one of the aims of the present invention is to get a nanotubular catalytic composition composed of a non-noble element from group VIII, preferably molybdenum or tungsten and of a second element of VIB group, preferably nickel or cobalt and a third component preferably composed of phosphoric acid. All the components are deposited in a high specific surface area support of an inorganic oxide composed by a metal of the IVB group with fibrilar and/or nanotubular morphology.

Another aim of the present invention is to obtain the sulphurized active components, deposited in nanofibrilar and/or nanotubular morphology from an inorganic oxide of a metal from IVB group. The sulphurized active components on the catalysts is obtained by direct sulphurization at temperatures between 300 and 500° C., preferably between 350 to 450° C., in a flow from 1 to 10% vol. of hydrogen sulfide diluted in hydrogen. Through this procedure oxidated species of active components turns into sulfide active components.

Active species aims of the present invention consist of sulfide phases of at least one non-noble metal of VIII group and of at least one metal of VIB group from the periodic table and optionally a third component composed of an halogenous, phosphorous, or borum, etc.

One more aim of the present invention is that it considers the interaction establishing between sulfides species and the high specific surface area support with nanotubular morphology, which creates highly active species for hydrodesulphurization and hydrodenitrogenation reactions in light and intermediate oil fractions.

BRIEF DESCRIPTION OF THE DRAWINGS

With the aim of obtaining an understanding of the catalytic composition for hydroprocessing reactions of light and intermediate oil fractions, reference will be made to the figures accompanying it.

DETAILED DESCRIPTION OF THE INVENTION

Figure 1:
In FIG. 1 transmission electronic microscope images of the support 3 from table 1 is presented, illustrating $TiO_2$ support nanotubes calcinated at 400° C. This support was used to prepare catalyst C described in example 3.

The present invention relates to a novel catalytic composition with nanotubular morphology highly active for hydroprocessing reaction of different petroleum fractions, preferably hydrodesulfirization and hydrodesnitrogenation reactions of light and intermediate oil fractions, consisting of an element from VIB group, preferably molybdenum or tungsten or combinations of them, starting from an aqueous solution of ammonium salt of molybdenum or tungsteno and of at least one element of the VIII group, preferably cobalt and/or nickel or combinations of them, starting from an aqueous solution of a cobalt and/or nickel salt that can be nitrate, chloride, acetate, hydroxide, carbonate or its mixtures, etc., and optionally the impregnation of a third component consisting of an aqueous solution of an acid of an element from groups IIIA, VA and VIA, preferably phosphoric acid on top of a support of an inorganic oxide consisting of a metal belonging to IVB group, such oxides as titanium, which characterizes for having fibrilar and/or nanotubular morphology forming one-dimensional nanostructured materials.

For the specific case of the present invention light and intermediate oil fractions were considered, those comprising hydrocarbons whose boiling points are equal or lower than 180° C., and intermediate fractions, those comprising hydrocarbons with boiling points comprised between 180.1° C. and 400° C.

The inorganic metal oxides used as supports for the preparation catalytic composition aim of the present invention were obtained following the methodology described in the patent application PCT MX 03/00068 dated Aug. 22, 2003. Such supports were previously calcinated at a temperature between 300 to 500° C. and presented nanotubes and/or nanofibers morphology with specific surface areas determined by the BET method (Brunauer Emmett and Teller) between 15 to 500 m² depending on the nanotubes and/or nanofibers dimensions and consequently the conditions under the nanofibers and/or nanotubes were synthesized. In table 1 some of the textural characteristics are presented. They present a crystalline monoclinic structure whose unit cell is described by the C 2/M spatial group. They present wide diffraction peaks, preferably oriented in the direction (020).

For the preparation of the catalyst of the present invention, the aforementioned supports are first contacted with an aqueous solution containing at least one salt from a element from the VIB group, in a concentration that permits dispersing from 2 to 20 atoms, preferably between 4 to 10 atoms of the subject element that can be molybdenum or tungsten, per square nanometer of surface area of the support with nanotubular morphology. The water excess is eliminated through drying at temperature between 50-110° C.

The resulting impregnated material is again contacted with an aqueous solution containing at least one salt from a non-noble element from group VIII, preferably cobalt and/or nickel. The corresponding salt could be a nitrate, chloride, acetate, hydroxide, carbonate or its mixtures, preferably acetate, in a concentration that permits obtaining an (element from group VIIIB)/(element from group VIIIB+element from group VIB) atomic ratio between 0.1 to 1. The liquid excess is eliminated by drying at a temperature between 50-110° C.

Optionally the resulting material could be put in contact with an acidic aqueous solution from an element from the IIIA, VA, or VIIA group that could phosphorus, boron or a halogen, preferably phosphorus, in a concentration between 0.1 to 5% in weight, allowing to obtain an (element from group VA)/(element from group VIIIB+element from group VIB) atomic ratio between 0.01 to 0.3. The water excess is eliminated by drying at a temperature between 50-110° C.

Figure 2:
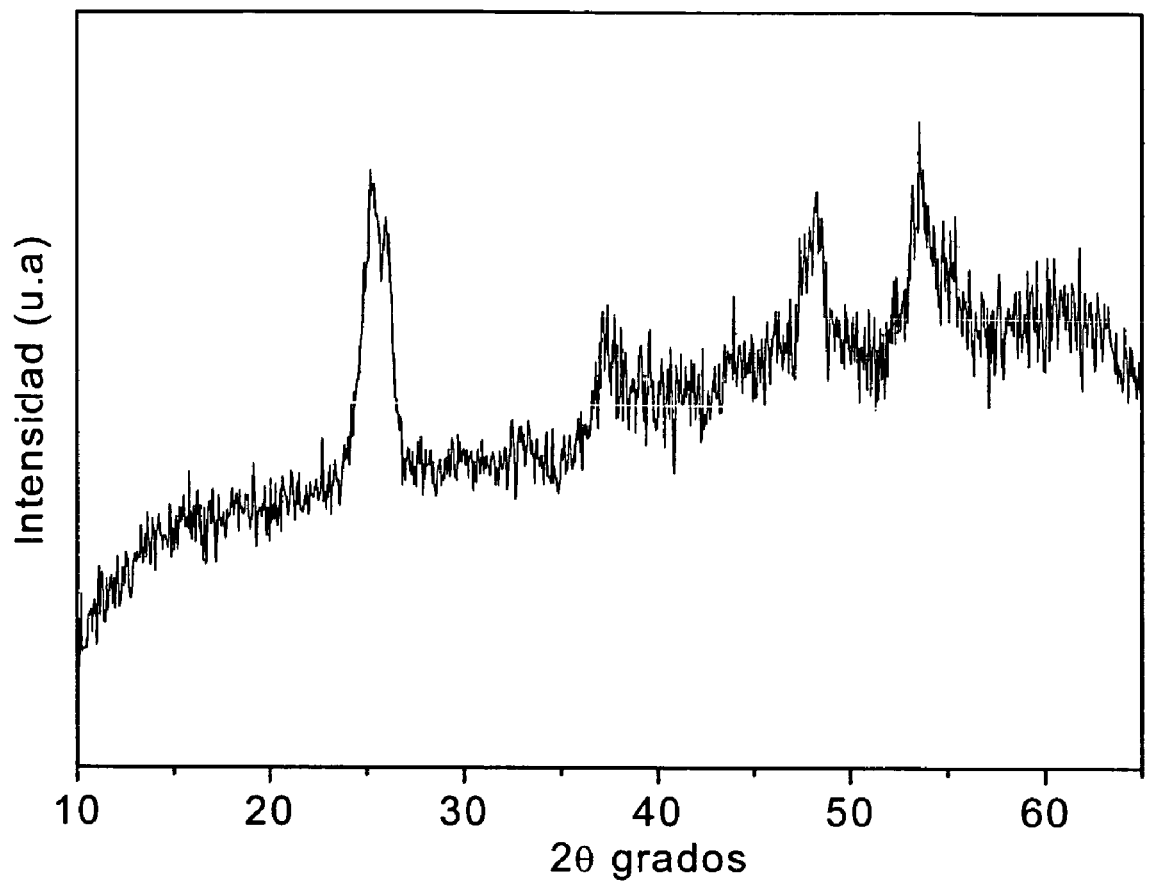
FIG. 2 indicates X Rays diffraction pattern referred to example 3, Catalyst C, characteristic of catalytic composition with crystal sizes around 10 nm, aim of the present invention.
Figure 3:
FIG. 3 exhibits an electronic microscope image characteristic of the catalytic composition which is an object of the present invention, Catalyst C.

The material obtained is submitted directly to a sulfiding process, consisting of heating the sample at a temperature between 300 to 500° C., for a period of time between 1 to 10 h, preferably from 2 to 6 h, in a reducing atmosphere composed by a hydrogen flow mixed with a sulphured component, which can be hydrogen sulfide, carbon disulphide, thiophene, a hydrocarbon fraction containing sulfur compounds, such as a spiked naphtha, etc., preferably hydrogen sulfide. The composition may be sulfided with a volumetric ratio of 50 to 600 liters of hydrogen/liter of hydrocarbon fraction containing sulfur compounds. The reducing gas flow to activate the catalytic composition of the present invention (10 to 100 cm³/min) should contain a concentration of the sulphured component between 1 to 50% in molar basis, balanced preferably with hydrogen. In FIG. 2 it is observed that the catalysts obtained present a diffraction pattern with characteristic peaks from the titanium oxide monoclinic structure with crystal size lower than 10 nm, preferably lower than 3 nm, indicating a high dispersion of the active components sulphurized species. The crystal size can be sufficiently small that no crystalline features show in a typical X-ray diffraction pattern. The catalyst with nanotubular morphology aim of the present invention is presented in FIG. 3. The catalyst textural properties in its sulfided form are presented in Table 2.

Another activation methodology of the nanotubular catalytic composition of the present invention, includes a pre-calcining step to obtain the oxidized species of active components aforementioned. Therefore, once the impregnation of the components of the active phases is carried out, the catalytic composition is submitted to a calcination treatment at a temperature between 300 to 500° C., preferably between 350 to 450° C. The material is calcined under oxidizing atmosphere, with an air flow between 10 to 100 cm³/min, during a period of time between 2 to 10 h, preferably from 2 to 6 h, to obtain the oxidic phases from the precursors. After that pre-treatment, the sulfiding procedure as indicated in the aforementioned paragraph should be applied.

Sulfided active species deposited on the support with the nanotubular morphology, from the inorganic material from IVB group, goes through a second sulfiding treatment before being used as catalyst in the hydroprocessing reaction aimed to re-sulfide those species that could have been sulfated by exposure to air. Such treatment consists of heating the sample at a temperature between 300 to 500 ° C., preferably from 350 to 450 ° C. during a period of time between 1 to 10 h, preferably from 1 to 3 h, in a reducing atmosphere composed of a hydrogen flow and a sulphured component, which can be a hydrogen sulfide, carbon disulphide, thiophene, a hydrocarbon fraction containing sulfur compounds, such as a spiked naphtha, etc., preferably hydrogen sulfide. The reducing gas flow to re-activate the sample should be between 10 to 100 cm³/min, preferably between 30 to 80 cm³/min and must include a sulphured component in a concentration between 1 to 50% in molar basis, preferably balanced with hydrogen.

Once activated sulfided species are obtained, the catalyst is kept isolated from the environment, within the reactor used to carry out the sulfiding procedure. The catalyst could be then poured in the light or intermediate petroleum fraction to hydroprocess, preferably hydrodesulfurize or hydrodenitrogenate, minimizing exposure of sulfided catalysts to the environment thus avoiding its de-activation due to sulfated species formation. The aforementioned procedure is carried out on an analytical scale with the aim of accurately measuring the amount of catalyst fed to the reactor. Preferably the catalyst must be added under argon inert atmosphere to avoid sulfates formation as much as possible.

The catalytic composition of the present invention has a specific surface area between 10 to 400 m²/g, preferably between 15 and 300 m²/g, and a total pore volume between 0.2 and 1.5 cm³/g, preferably between 0.4 and 1.0 cm³/g. The hydroprocessing reaction conditions, which include hydrodesulfurization and hydrodenitrogenation, using the catalytic compositions of the present invention for light and intermediate hydrocarbon fractions are conducted, for example, at reaction temperatures between 200 to 600° C., reaction pressures between 1 to 200 kg/cm², using hydrogen feed flow of 50 to 600 liters at standard conditions and a space velocity (LHSV) of 0.05 to 8 hours.

For hydrodesulfurization reactions to test the nanotubular catalytic composition of the present invention, the dibenzotiophene (DBT) model molecule was used (Examples 1 to 6), as such compound represents the organo-sulfur hydrocarbons present in light and intermediate petroleum fractions (M. Daage and R. R. Chianelli, J. Catal. 149, 412-427 (1994)).

The control of the DBT amount fed to the reactor is carried out in a similar way as to that of the catalyst to be tested. This means that a hydrocarbon amount is weighed on a high precision analytical scale. The DBT amount to be hydrotreated is fed to the reactor and then the catalyst is added following the procedure aforementioned, thus avoiding its exposure to the environment.

When a light or intermediate fraction of petroleum is to be hydrodesulfurized, the addition of catalyst is directly done to 10 ml of that fraction, which is later completed to 100 ml, after pouring into the reactor.

The hydrodesulfurization reaction is carried out in a triphase autoclave type reactor in which the reaction mixture either formed by the hydrocarbon used as solvent and DBT or the petroleum fraction to be hydrodesulfurized and containing the catalyst to be evaluated is fed.

Once the reaction mixture has been loaded to the reactor, the system is pressurized with an inert gas such as nitrogen, helium and/or argon, preferably nitrogen, with the aim of removing existing air. Then, vigorous mechanical stirring between 100 to 2000 rpm, preferably between 800 to 1500 rpm is applied with the aim of avoiding the presence of interphase difussional effects. The reactor temperature is raised to a final operating temperature in the range between 300 to 400° C., preferably between 320 to 360° C. Finally, the operating pressure is adjusted, by adding hydrogen, to 40 to 100 kg/cm², preferably between 50 to 70 kg/cm².

Once reaction conditions described in the previous paragraph are achieved, the catalytic evaluation was carried out by frequent sampling with the purpose of determining parameters such as DBT conversion, reaction selectivity and output. It is considered a reaction model of pseudo first order regarding the reactant hydrocarbon and zero order regarding hydrogen as this is fed in excess.

For identification and quantification of the reaction products, the liquid samples were analyzed in an XL Perkin Elmer Auto System Chromatograph equipped with flame ionization detector and an Ultra 2 Capilar Column (Crosslinked 5% Ph Me Silicone).

The catalytic activity was determined by calculating the specific rate constant (k) of the catalyst of the present invention, which is defined in $\{l/g.s\}$. Starting from the specific constant the intrinsic rate constant was also determined, which is defined as the reaction rate constant per unit of exposed area and it given in $\{l/m^2.s\}$. These parameters are reported in Table 2.

For comparison purposes, the catalytic activity of a commercial catalyst was determined, based in the same active components deposited on a high surface area alumina support. The specific rate constant from this catalyst was determined, and it was set as the reference rate constant, being used to determine the relative activity of the prepared catalysts. Such ratio is the catalyst reaction rate constant divided by the rate constant of the reference commercial catalyst.

The catalysts formulations of the present invention were tested, presenting a hydrodesulfurizating specific activity 3 to 15 times higher than the commercial catalyst used for comparison purposes.

In the cases where DBT was used as model molecule model for hydrodesulfurization reactions, the catalytic formulation of the present invention presented high selectivity towards biphenyl (BP) formation (about 90 to 100%,) after a three hour reaction, and low performance towards ciclohexilbenzene (CHB) (about 1 to 10%) as product from the hydrogenation of aromatic rings, which indicated that these catalysts have low hydrogenating capacity.

The interaction among sulfided active species and the support of high surface area with nanotubular morphology creates highly active species for light and intermediate petroleum fraction hydrodesulfurization reactions.

Finally, in the Example 7 the hydroprocessing capacity of the catalytic composition of the present invention is shown, in presence of a real feedstock (Table 4), where hydrodesulfurization and hydrodenitrogenation reactions takes place simultaneously. The decrease in the amounts of sulphur and nitrogen content in the hydrotreated product was remarkable.

EXAMPLES

Some examples related to the application of the highly active catalytic composition for petroleum fractions hydrotreating are presented in the following. They are illustrative and do not limit the scope of the invention.

The supports used consist of an inorganic oxide with nanofiber and/or nanotubular morphology and they were prepared according to the procedures describes in the requested patent PCT MX 03//00068.

The texture and structural characteristics of supports calcined at a temperature between 300 to 600° C. are presented in Table 1.

Example 1

The support that presents a nanofiber and/or nanotubular morphology is basically composed of titanium and oxygen in its monoclinic phase, with an atomic O/Ti ratio close to 2.0.

The support was soaked in an aqueous solution containing non-noble metals from group VIIIB, metals from group VIB and metals from VA group from the periodical table of the elements. The soaking solution was prepared starting form 0.57 g of ammonium heptamolybdate in 10 ml of deionized water. 1 ml of ammonium hydroxide at 30% was added with the purpose of increasing the pH to 7.0-14.0 to obtain an aqueous solution with higher concentration of $MoO_4^{2-}$ species. The aforementioned solution was contacted with the support and the mixture was stirred at room temperature during 1 h. The excess liquid was then eliminated by heating at a temperature between 50-120° C., preferably between 80 to 110° C. Another solution was prepared consisting of 0.0015 g of phosphoric acid in 10 ml of bi-distilled water. This solution was contacted with the support containing molybdenum and cobalt species. The impregnated material stood under stirring at room temperature for 1 h. Then, heating in the rotavapor was started to a temperature between 50 to 120° C., preferably between 80 to 110° C. Once that all components required were deposited (at phosphorus/((phosphorus+molybdenum) atomic ratio between 0.01 to 0.3) by means of successive soaking procedure, the impregnated material was submitted to drying at 100° C. for 12 h. Later, the solid was submitted to activation by direct sufidation treatment. The sulfidation treatment consisted of heating the impregnated material at a temperature between 300 to 500° C., preferably between 350 to 450° C., under gas flow from 50 to 100 cm³/min of a mixture containing a hydrogen sulfide at 1 to 50% volume balanced with hydrogen.

The catalyst obtained, named catalyst A was tested in the dibenzothiophene hydrodesulfurization reaction to determine its hydrodesulfurizating activity and it was characterized in its sulfided form (Table 2).

Example 2

A catalytic formulation starting from 0.6 g of support 2 was prepared with the textural characteristics presented in Table 1. Such support presents a nanofiber and/or nanotubular morphology and it is basically composed by titanium and oxygen in its monoclinic phase, with an atomic O/Ti ratio close to 2.0.

The support was contacted with the same solution of metals as in Example 1, with the same successive soaking method. To keep a similar surface atoms concentration it was necessary to increase the molybdenum amount deposited in this higher surface area support. The soaking solution was prepared starting from 0.156 g of ammonium heptamolybdate in 6 ml of deionized water. 4 ml of ammonium hydroxide at 30% was added with the purpose of increasing the pH between 7.0 to 14.0 to obtain an aqueous solution with high $MoO_4^{2-}$ species concentration. Such solution was deposited on the support in the same way as in Example 1. The second soaking solution was prepared starting from 0.1 g of cobalt acetate, dissolved in 10 ml of deionized water and it was contacted with the support containing the deposited molybdenum species, following the same procedure as in Example 1. The third soaking solution was prepared starting from 0.01 g of phosphoric acid in 10 ml of bi-distilled water, which was mixed with the support containing molybdenum and cobalt species, following the same procedure as in Example 1, keeping an atomic ratio (cobalt/cobalt+molybdenum) between 0.1 to 1, preferably between 0.01 to 0.3. Once all required components are deposited by means of successive soaking, the impregnated material was submitted to a drying process at 110° C. from 5 to 8 hr and then to activation by direct sulfiding as carried out in Example 1.

The catalyst obtained, named catalyst B was tested in the dibenzothiophene hydrodesulfurization reaction to determine its hydrodesulfurizating activity and it was characterized in its sulfided from (Table 2).

Example 3

A catalytic formulation was prepared starting form 1.3 g of support 3, which textural properties are presented in Table 1. Such support presents a nanofiber and/or nanotubular morphology and it is basically composed of titanium and oxygen in its monoclinic phase with an atomic ratio O/Ti close to 2.0.

The support was contacted with a similar metals solution as in Example 1, through a successive soaking method. To keep the surface atom concentration, it was necessary to increase the molybdenum amount deposited in this support of higher specific surface area. Metals concentration of the impregnating solution was varied in this example by increasing the water amount. The impregnating solution was prepared starting from 0.551 g of ammonium heptamolybdate in 100 ml of deionized water. 6 ml of ammonium hydroxide at 30% were added with the aim of increasing the pH at 10.0 to obtain an aqueous solution with high $MoO_4^{2-}$ species concentration. Such solution was contacted with the support through the same procedure as in Example 1. The second soaking solution was prepared starting from 0.6 g of cobalt acetate. The salt was dissolved in 20 ml of deionized water and it was contacted with the support containing the molybdenum species, following the same procedure as Example 1. A third impregnating solution was prepared starting form 0.03 g of phosphoric acid diluted in 20 ml of bi-distilled water. This solution was contacted with the support already containing the molybdenum and cobalt species, following the same procedure as in Example 1. Once all the required components were deposited, through the successive soaking procedure keeping the atomic ratio cobalt/(cobalt+molybdenum) between 0.1 to 1, preferably between 0.2 to 0.5 and an atomic ratio phosphorus/(phosphorus+molybdenum) between 0.01 to 0.3, the impregnated material was submitted to drying then to direct sulfiding as that performed in Example 1.

The catalyst obtained, named catalyst C was tested in the dibenzothiophene hydrodesulfurization to determine its hydrodesulfurizating activity and it was characterized in its sulfided form (Table 2).

TABLE 1

Textural properties of supports used for the preparations of the catalytic compositions aim of the present invention.

| Support | Specific Surface area (m²/g) | Pore volume (cm³/g) | Mean Pore diameter (nm) |
|---|---|---|---|
| 1 | 50 | 0.31 | 14.7 |
| 2 | 214 | 0.74 | 7.7 |
| 3 | 293 | 0.55 | 5.6 |

TABLE 2

Textural properties of sulfided catalytic compositions aim of the present invention..

| Catalysts | Specific Surface Area (m²/g) | Pore Volume (cm³/g) | Pore diameters (nm) |
|---|---|---|---|
| A | 15 | 0.12 | 16.7 |
| B | 143 | 0.53 | 7.7 |
| C | 153 | 0.29 | 5.9 |

TABLE 3

Catalytic activity results in dibenzothiophene desulphurization reaction of the catalysts aim of the present invention.

| Catalysts | K Specific rate constant (L/g · s) × 10⁵ | K Intrinsic rate constant (L/m² · s) × 10⁷ | K Relative (K Cat./K ref. E) |
|---|---|---|---|
| A | 1.17 | 7.85 | 0.43 |
| B | 35.3 | 24.7 | 12.8 |
| C | 21.4 | 14.0 | 7.8 |
| D | 7.3 | — | 2.8 |
| E | 2.75 | 1.52 | 1.0 |

TABLE 4

Physical-chemical Properties of Strain run gas oil (SRGO) used for hydroprocessing reaction in the catalytic evaluation of the catalytic composition aim of the present invention.

| Strain Run Gas OIL | |
|---|---|
| °API | 32.7 |
| Viscosity (@37.8° C.), cp | 4.1 |

TABLE 4-continued

Physical-chemical Properties of Strain run gas oil (SRGO) used for hydroprocessing reaction in the catalytic evaluation of the catalytic composition aim of the present invention.

| Relative density | 0.8581 |
| --- | --- |
| Average molecular weight ASTM-D-86 (° C.) | 250 |
| Initial boiling point | 237.6 |
| Final boiling point | 358.4 |
| Saturated compounds, % peso | 67.49 |
| Polar compounds, % peso | 1.07 |
| Total aromatics, % peso | 35.32 |
| Total nitrogen, ppm | 357 |
| Basic Nitrogen, ppm | 104 |
| Total sulfur, % peso | 1.3985 |
| Thiophenes, ppm | 1149 |
| Benzothiophenes, ppm | 5102 |
| Dibenzothiophenes, ppm | 7657 |

TABLE 5

Activity results of the catalyst composition described in example 7, in hydroprocessing reaction of Strain run gas oil.

| Activity parameters | Reaction Temperature (° C.) | |
| --- | --- | --- |
| | 350 | 370 |
| HDS (%) | 99.64 | 99.85 |
| HDN (%) | 98.0 | 99.5 |
| H$_2$ consumption (L std/L)* | 45 | 52 |

*L std/L: liters of H$_2$ at Standard conditions per liter of SRGO fed.

We claim:

1. A catalytic composition for the hydroprocessing of light and intermediate hydrocarbons, comprising at least one non-noble group VIII metal, and at least an element of group VIB deposited on a catalyst support in the form of nanotubes of an inorganic oxide of the group IVB.

2. A catalytic composition according to claim 1, comprising one non-noble group VIB metal has been dispersed in a group IVB inorganic oxide support in the form of nanotubes, with a surface atoms density of 2-20 atoms/nm$^2$.

3. A catalytic composition according to claim 1, comprising group VIII and VIB metals are dispersed on the surface or within the structure of the said nanotubes support wherein said atomic metal ratio (metal of group VIB/(metal of group VIB+metal of group VIII)) is between 0 and 0.1.

4. A catalytic composition according to claim 1, being promoted by a second group VIB element in such a concentration that (metal of group VIB/(metal of group VIB+element of group VIII)) atomic ratio is between 0.1 and 1, said composition being in its oxidized form.

5. A catalytic composition according to claim 4, being promoted by a third element of group VA in a concentration between 0.5 to 5 wt. %.

6. A catalytic composition according to claim 1, in which said composition after addition of elements of groups VIII, VIB and VA to the said nanotube support, made up of group IVB metals, is calcined in an oxidant atmosphere, between 300 and 500° C. for 2 to 10 hours.

7. A catalytic composition according to claim 1, wherein after addition of elements of groups VIII, VIB and VA to the said nanotube support, made up of group IVB metals, and without any oxidant calcinations, said composition is exposed to a sulfiding atmosphere.

8. A catalytic composition according to claim 1, comprising: (i) cobalt or nickel or a combination thereof, and (ii) molybdenum or tungsten, or a combination thereof, deposited on catalyst support whose particles are in the shape of nanotubes formed by titanium oxide.

9. A catalytic composition according to claim 1, wherein phosphorous is also deposited on said support.

10. A catalytic composition according to claim 1, wherein sulfided species of group VIII and VIB elements are homogeneously dispersed on the surface of an inorganic metal oxide support having its particles into nanotube shape with crystal size of less than 10 nm.

11. A catalytic composition according to claim 1, wherein said composition has a specific surface area between 10 to 400 m$^2$/g, and a total pore volume between 0.2 and 1.5 cm$^3$/g.

12. A catalytic composition according to claim 1, presenting a hydrodesulfurization specific activity in between $1 \times 10^{-5}$ to $30 \times 10^{-1}$ g$^{-1}$ s$^{-1}$.

13. A catalytic composition according to claim 1, presenting 1.5 to 20 times higher hydrodesulfurization specific activity than that of the same said group of metals deposited on an alumina-type support.

14. A catalytic composition according to claim 1, presenting 5 to 70 times higher hydrodesulfurization intrinsic activity than that of same said group of metals deposited on an alumina-type support.

15. A hydroprocessing process for treating light and intermediate hydrocarbon fractions, which comprises contacting said hydrocarbon fraction with a catalytic composition comprising at least one non-noble group VIII metal, and at least an element of group VIB deposited on a catalyst support in the form of nanotubes of an inorganic oxide of the group IVB under reaction conditions comprising a reaction temperature between 200 to 600° C., a reaction pressure between 1 to 200 Kg/cm$^2$, and a hydrogen feed flow of 50 to 600 liters at standard conditions and a space velocity (LHSV) of 0.05 to 8 hours$^{-1}$.

16. A hydroprocessing process according to claim 15, wherein said hydrocarbon fractions have boiling points below 180° C., as in gasolines.

17. A hydroprocessing process according to claim 15, hydrocarbon fractions have boiling points in between 180.1 and 400° C., as in light gas oils.

18. A catalyst composition according to claim 1, wherein said inorganic oxide of Group IVB is hydrogen titanate.

19. A catalyst composition according to claim 1, wherein said inorganic oxide of Group IVB is a crystalline monoclinic structure whose unit cell is described by the C 2/M spatial group.

20. A catalyst composition according to claim 1, wherein said catalyst composition is in a sulfided form.

21. A hydroprocessing process according to claim 15, wherein said inorganic oxide of Group IVB is hydrogen titanate.

22. A hydroprocessing process according to claim 15, wherein said inorganic oxide of Group IVB is a crystalline monoclinic structure whose unit cell is described by the C 2/M spatial group.

23. A hydroprocessing process according to claim 15, wherein said catalyst composition is sulfided prior to contacting said hydrocarbon fraction under said reaction conditions.

24. A hydroprocessing process according to claim 23, wherein said composition is sulfided at temperatures between 300 and 500° C. by being exposed to a mixture of (i) reducing gas and (ii) hydrogen sulfide, carbon sulfide, thiophene, or a hydrocarbon fraction containing sulfur compounds.

25. A hydroprocessing process according to claim 23, wherein said composition is sulfided with a volumetric ratio of 50 to 600 liters of hydrogen/liter of hydrocarbon fraction containing sulfur compounds.

26. A catalytic composition for hydroprocessing light and intermediate hydrocarbon fractions comprising: (i) at least one metal selected from the group consisting of cobalt and nickel and (ii) and at least one metal selected from the group consisting of molybdenum and tungsten, deposited on a catalyst support comprising hydrogen titanate nanotubes.

* * * * *